United States Patent Office 2,950,287
Patented Aug. 23, 1960

2,950,287

PREPARATION OF WATER SOLUBLE EPINOCHROME DERIVATIVES

Junichi Iwao, Tennoji-ku, Osaka, and Koichi Tomino, Senhoku-gun, Osaka-fu, Japan, assignors to Tanabe Seiyaku Co., Ltd., Osaka, Japan, a corporation of Japan No Drawing. Filed Feb. 5, 1957, Ser. No. 638,221

Claims priority, application Japan Feb. 18, 1956

11 Claims. (Cl. 260—319)

This invention relates to a process of preparation of soluble epinochrome derivatives and to the resulting product. More particularly, the invention relates to the process of preparation of monosemicarbazone of alkali metal salts of epinochrome-2-sulfonic acid.

The preparation and properties of epinochrome have been described by Sobotaka and Austin (J. Am. Chem. Soc., vol. 73, pp. 3077–3079 (1951)). But instability of this substance constitutes an impediment to its therapeutic application. Certain derivatives of epinochrome, particularly the monosemicarbazone thereof, are stable and considered to be applicable for therapeutic uses. However, it has been found that these derivatives are of extremely low solubility in water and are inferior to the corresponding adrenochrome derivatives in hemostatic activity. Therefore, it has been impossible to prepare their aqueous solutions which are desirable in therapeutics.

The present invention is intended and adapted to overcome the defects inherent in prior compounds of the type described, it being among the objects thereof to provide water soluble, effective, hemostatically active substances of the epinochrome type, which substances are quite stable over long periods.

It is also among the objects of the invention to provide a new process for the production of such substances which is simple and efficient, with a high yield of product.

In practicing the invention, it has been found that the difficulty encountered in the prior art may be overcome if a sulfonic radical is introduced into the 2nd position of an epinochrome monosemicarbazone molecule. More specifically, the sulfonic acid compound is in the form of a salt with a metal which renders the product water soluble.

According to this invention, when an alkali metal salt of epinochrome-2-sulfonic acid is condensed with semicarbazide, monosemicarbazone of an alkali metal salt of epinochrome-2-sulfonic acid is obtained. The reaction product is substantially soluble in water and very stable over a long period of time. Furthermore, it has been found that the reaction product has a hemostatic activity as strong as that of adrenochrome monosemicarbazone.

The condensation with semicarbazide can be carried out by adding an aqueous solution, preferably containing sodium acetate, of an acid salt of semicarbazide such as the hydrochloride, to an aqueous solution of an alkali metal salt of epinochrome-2-sulfonic acid, by allowing the mixture to stand until orange-colored crystals are precipitated and by recovering the crystals by means of filtration.

The starting material, which is preferably an alkali metal salt of epinochrome-2-sulfonic acid, may be prepared by oxidation of an alkali metal salt of α-methylamine-β-3,4-dihydroxyphenylethane sulfonic acid with an oxidizing agent, such as silver oxide, potassium ferricyanide or chloranil, dissolved in water or an organic solvent, and by filtration if necessary. The oxidation mixture as such can be employed as the starting material of this invention. However, a crystalline alkali metal salt of epinochrome-2-sulfonic acid which has been recovered from the oxidation mixture may be also employed.

The invention is typically illustrated by the following reaction:

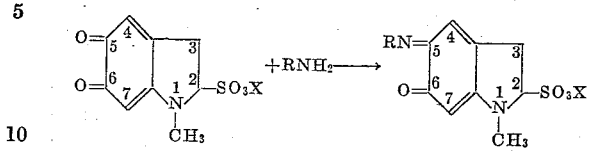

wherein M represents a metal capable of imparting water solubility to the product, preferably an alkali metal, i.e., sodium, potassium, lithium and ammonium; and R represents NH$_2$CONH—.

The following are specific examples which illustrate the nature of the invention without limiting it.

Example 1

A solution of 131.6 g. of potassium ferricyanide and 42.0 g. of sodium bicarbonate in 430 cc. of water is added at 15° C. to a solution of 26.9 of sodium α-methylamino-β-3,4-dihydroxyphenylethane sulfonate in 250 cc. of water. Color of the mixture is turned into dark red. A solution of 14.3 g. of semicarbazide hydrochloride and 17.7 g. of sodium acetate in 100 cc. of water is added to the mixture, and the solution thus obtained is allowed to stand until orange-colored crystals are precipitated. After filtration and recrystallization from water, 24.4 g. of orange-colored needle-like crystals of monosemicarbazone of sodium epinochrome-2-sulfonate, decomposing at 227–228° C. are obtained.

Example 2

A solution of 131.6 g. of potassium ferricyanide and 42.0 g. of potassium carbonate in 350 cc. of water is added at 15° C. to a solution of 24.7 g. of α-methylamino-β-3,4-dihydroxyphenylethane sulfonic acid in 200 cc. of water. Color of the mixture is turned into dark red. A solution of 14.3 g. of semicarbazide hydrochloride and 17.7 g. of sodium acetate is added to the mixture, and the solution thus obtained is allowed to stand until orange-colored crystals are precipitated. After filtration and recrystallization from water, 25 g. of orange-colored needle-like crystals of monosemicarbazone of potassium epinochrome-2-sulfonate, decomposing at 300° C., are obtained.

While the invention has been described setting forth two specific examples, the invention is not limited to the details contained therein. Various changes in the proportions of the reactants, the temperatures, the solvents and other conditions may be made within the spirit of the invention without departing from the principles set forth herein.

We claim:

1. Process of preparation of therapeutically valuable monosemicarbazone of epinochrome-2-sulfonic acid comprising mixing a water-soluble salt of epinochrome-2-sulfonic acid with semicarbazide, whereby condensation of said substances takes place.

2. Process according to claim 1 in which said reactants are in water solution.

3. Process according to claim 1 in which said salt is of an alkali metal.

4. Process according to claim 1 in which the alkali metal salt of epinochrome-2-sulfonic acid is obtained by the oxidation of the alkali metal salt of α-methylamino-β-3,4-dihydroxyphenylethane sulfonic acid.

5. Process according to claim 1 in which semicarbazide in the form of a water-soluble salt is used in the presence of sodium acetate.

6. Process according to claim 1 in which said epinochrome-2-sulfonate is the sodium salt.

7. Process according to claim 1 in which said epinochrome-2-sulfonate is the potassium salt.

8. Process according to claim 4 in which the oxidation agent is taken from the class consisting of silver oxide, alkali metal ferricyanide and chloranil.

9. Process according to claim 4 in which the product of the oxidation mixture is directly reacted with said semicarbazide.

10. Process according to claim 4 in which the product of the oxidation mixture is first crystallized from said mixture and then reacted with said semicarbazide.

11. Process of preparation of therapeutically valuable monosemicarbazone of epinochrome-2-sulfonic acid comprising mixing a water-soluble salt of epinochrome-2-sulfonic acid with semicarbazide, the latter being in the form of a water-soluble acid salt, whereby condensation of said substances takes place.

References Cited in the file of this patent

UNITED STATES PATENTS

| | | |
|---|---|---|
| 2,180,801 | Engel | Nov. 21, 1939 |
| 2,204,544 | Engel | June 18, 1940 |
| 2,581,850 | Fleischhacker et al. | Jan. 8, 1952 |
| 2,835,678 | Iwao et al. | May 20, 1958 |

FOREIGN PATENTS

| | | |
|---|---|---|
| 5,328 | Great Britain | Jan. 21, 1904 |

OTHER REFERENCES

Bul'lock et al.: J. Chem. Soc. (London), 1951, pt. 1, pp. 712–716.

Sobotka et al.: J. Am. Chem. Soc., vol. 73, July–Sept. 1951, pages 3077–3079.

Braconier et al.: Arch int. Pharmacodyn, vol. 69, No. 2, pages 181–185 (1943).